April 26, 1938.  H. MOORE  2,115,342
KEY RING
Filed Nov. 6, 1937
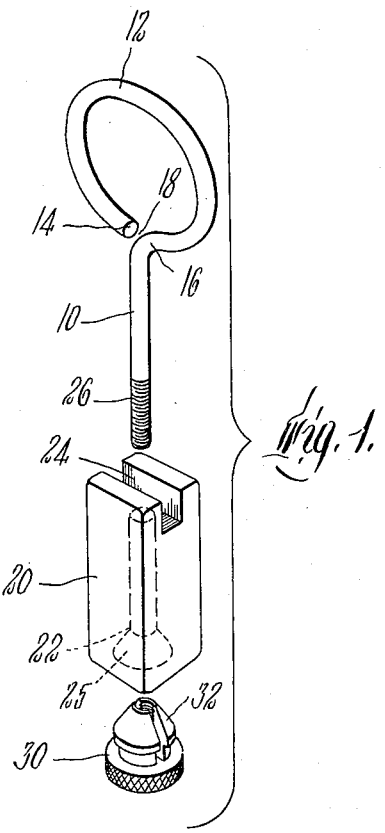
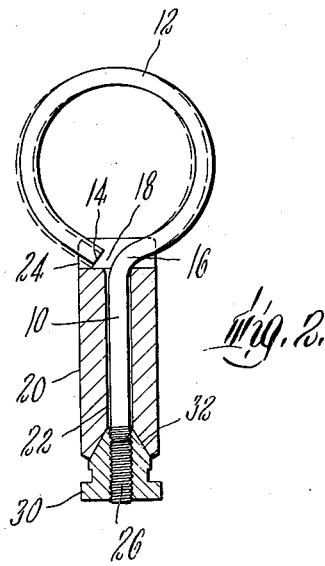
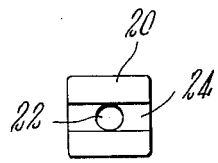
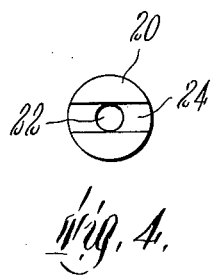
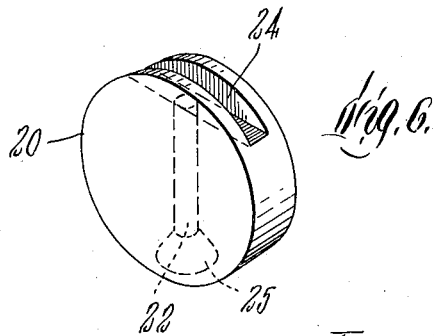
Inventor
Harrington Moore Patented Apr. 26, 1938

2,115,342

UNITED STATES PATENT OFFICE 2,115,342

KEY RING

Harrington Moore, Medford, Mass.

Application November 6, 1937, Serial No. 173,087

2 Claims. (Cl. 70—456)

This invention relates to an improved key ring consisting chiefly of a loop of bent wire having an opening which is closed by a closure member removably mounted on a shank extension of the loop. The key ring assembly is characterized by a completely closed ring or loop and a closure member on which advertising matter or decorative matter may be put.

For a more complete understanding of the invention, reference may be had to the following description, and to the drawing of which Figure 1 is a perspective view of the separate parts of an embodiment of the invention.

Figure 2 is an elevation showing some of the parts in section.

Figure 3 is an end view of the closure member.

Figures 4 and 5 are similar end views of closure members having different shapes.

Figure 6 is a perspective view of the closure member of another shape.

The key ring illustrated in Figures 1 and 2 comprises a piece of wire or similar material which has a straight shank portion 10 and a bent portion 12 forming a loop or ring. The free end 14 of the bent portion is spaced from the juncture 16 of the bent and straight portions, leaving a gap 18 through which keys may be inserted into or removed from the ring.

In order to close the gap 18, a closure member is provided which may consist of a block 20 of suitable material, preferably a molded plastic. By employing a colored transparent moldable material, key rings of very attractive appearance may be formed and advertising matter or the like may be placed on the side faces of the block 20. A longitudinal bore 22 is formed in the block to receive the shank 10. One end of the block is notched or grooved as at 24 to receive the free end 14 of the loop and the juncture portion 16 when the shank 10 is inserted in the bore 22. The other end of the block is counterbored as at 25. The free end of the shank 10 is threaded as at 26, some of this threaded portion projecting from the other end of the block 20 when the ring 12 is seated in the notch 24 of the block. A suitable finger nut 30 is screwed onto the threaded end 26. This nut is preferably made with a split conical portion 32 adapted to enter and fit into the counterbore 25 as indicated in Figure 2. This wedges the parts of the conical portion 32 tightly against the threaded portion 26 of the shank 10 and thus binds the nut 30 to prevent it from working loose. When the nut 30 is set up firmly, it draws the shank 10 into the bore so that the portions 12 adjacent to the free end 14 and the juncture 16 are pressed strongly against the bottom of the notch 24. This results in a slight distortion of the ring 12, as indicated by dotted lines in Figure 2, sufficient to maintain a tensional stress on the shank 10. This constant tension on the shank 10 keeps the conical portion of the nut 30 tightly wedged within the counterbore 25.

While the ring 12 is illustrated as circular in form, it may be made in the form of an oval or any other nearly closed loop as desired. Furthermore, any suitable or desirable securing means for the shank and block may be employed in the place of the finger nut 30. The block illustrated in Figure 1 is a rectangular cross section, but, if desired, the block may be circular as indicated in Figure 4, oval as indicated in Figure 5, or otherwise as desired. Figure 6 shows the block in the form of a disk through which the bore 22 passes diametrically, the notch at one end of the bore being in a circumferential edge of the disk.

It is evident that various other modifications and changes may be made in the specific details of the key ring herein shown and described without departing from the spirit or scope of the invention as defined in the following claims.

I claim:—

1. A key ring comprising a piece of wire having a straight shank portion and a bent loop portion, the free end of the bent portion being adjacent to but spaced from the juncture of the shank and loop, a block through which said shank extends, said block having a notch in an end thereof for said juncture and free end portions of the wire, and a nut in threaded engagement with the shank and pressing against the other end of said block.

2. A key ring comprising a wire bent to form a loop with a small gap for the insertion and removal of keys and a straight shank portion with a threaded end projecting from said loop, a block having a bore therethrough to receive said shank, said block having a transverse notch at one end of said bore and a counterbore at the other end of the bore, and a nut screw-threaded on the end of said shank, said nut having a conical projection wedged in said counterbore.

HARRINGTON MOORE.